(12) United States Patent
Yamamoto et al.

(10) Patent No.: US 10,428,968 B2
(45) Date of Patent: Oct. 1, 2019

(54) VALVE CORE (71) Applicant: PACIFIC INDUSTRIAL CO., LTD., Ogaki-shi, Gifu-ken (JP)

(72) Inventors: Masahiko Yamamoto, Gifu-ken (JP); Masatoshi Aimoto, Gifu-ken (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 0 days.

(21) Appl. No.: 15/761,791

(22) PCT Filed: Mar. 22, 2016

(86) PCT No.: PCT/JP2016/058958
§ 371 (c)(1),
(2) Date: Mar. 20, 2018

(87) PCT Pub. No.: WO2017/126134
PCT Pub. Date: Jul. 27, 2017

(65) Prior Publication Data
US 2018/0274690 A1 Sep. 27, 2018

(30) Foreign Application Priority Data
Jan. 22, 2016 (JP) .................................. 2016-010250

(51) Int. Cl.
*F16K 27/04* (2006.01)
*F16K 1/32* (2006.01)
(Continued)

(52) U.S. Cl.
CPC .......... *F16K 27/041* (2013.01); *B60C 29/002* (2013.01); *F16K 1/32* (2013.01);
(Continued)

(58) Field of Classification Search
CPC . F16K 37/041; F16K 1/32; F16K 1/34; F16K 1/38; F16K 1/42; B60C 29/002
See application file for complete search history.

(56) References Cited

U.S. PATENT DOCUMENTS

| 6,050,295 A | 4/2000 | Meisinger et al. |
| 6,719,003 B2 | 4/2004 | Schroeder et al. |

(Continued)

FOREIGN PATENT DOCUMENTS

| CN | 2452783 Y | 10/2001 |
| CN | 1576669 A | 2/2005 |

(Continued)

OTHER PUBLICATIONS

Oct. 19, 2017 Office Action issued in Taiwanese Patent Application No. 10621061490.

(Continued)

*Primary Examiner* — Kevin L Lee
(74) *Attorney, Agent, or Firm* — Oliff PLC (57) ABSTRACT

A valve core capable of suppressing manufacturing costs, including: a first core cylinder body, a second core cylinder body having a valve opening on an opposite side to the first, a movable member having a valve body which opens and closes the valve opening at the front end of a shaft section linearly movably extending through the insides of the core cylinder bodies, an elastic member in contact with the movable member and the first body and biasing to sandwich the second body between the first and valve body, and a pair of fitting sections including a first and a second fitting section on the core cylinder bodies and which are rotatably fitted and are separable from each other without interfering. The fitting sections have cylindrical shapes that are detachably fitted to each other, and the first section has a stepped surface with which the second section is in contact.

16 Claims, 9 Drawing Sheets (51) Int. Cl.
  *F16K 1/34* (2006.01)
  *F16K 1/38* (2006.01)
  *F16K 1/42* (2006.01)
  *F16K 15/06* (2006.01)
  *F16K 15/20* (2006.01)
  *B60C 29/00* (2006.01)

(52) U.S. Cl.
  CPC ............ *F16K 1/34* (2013.01); *F16K 1/38* (2013.01); *F16K 1/42* (2013.01); *F16K 15/06* (2013.01); *F16K 15/063* (2013.01); *F16K 15/205* (2013.01)

(56) References Cited

U.S. PATENT DOCUMENTS

| | | | |
|---|---|---|---|
| 7,306,005 | B2 | 12/2007 | Moldthan |
| 8,087,642 | B2 * | 1/2012 | Lucas ............... F16K 1/303 251/149.1 |
| 2003/0116199 | A1 | 6/2003 | Schroeder et al. |
| 2003/0116740 | A1 | 6/2003 | Schroeder et al. |
| 2004/0261848 | A1 | 12/2004 | Kayukawa |
| 2007/0246099 | A1 * | 10/2007 | Yamamoto ............... B60C 29/00 137/234.5 |
| 2010/0038573 | A1 | 2/2010 | Lucas |

FOREIGN PATENT DOCUMENTS

| | | |
|---|---|---|
| CN | 103492718 A | 1/2014 |
| DE | 1942244 A1 | 10/1970 |
| EP | 1 491 804 A1 | 12/2004 |
| JP | 1-206167 A | 8/1989 |
| JP | 2002-517682 A | 6/2002 |
| JP | 2002-340206 A | 11/2002 |
| JP | 2005-016625 A | 1/2005 |
| JP | 2005-036963 A | 2/2005 |
| JP | 2007-292089 A | 11/2007 |
| JP | 2009-523975 A | 6/2009 |
| WO | 2012/099649 A1 | 7/2012 |

OTHER PUBLICATIONS

Jun. 21, 2016 International Search Report issued in International Patent Application No. PCT/JP2016/058958.
Jun. 21, 2016 Written Opinion issued in International Patent Application No. PCT/JP2016/058958.
Mar. 4, 2019 Office Action issued in Korean Patent Application No. 10-2018-7006270.
Nov. 21, 2018 Extended Search Report issued in European Patent Application No. 16886374.4.
Dec. 4, 2018 Office Action issued Japanese Patent Application No. 2016-010250.
Dec. 18, 2018 Office Action issued in Chinese Patent Application No. 201680052987.9.
Jun. 12, 2019 Office Action issued in Japanese Patent Application No. 2016-010250.

* cited by examiner

VALVE CORE

TECHNICAL FIELD

The present invention relates to a valve core screwed and mounted in a core mounting hole.

BACKGROUND ART

Conventionally, as a valve core of this type, known is one including a first core cylinder body having a male screw on its outer peripheral surface and a second core cylinder body having a seal portion on its outer peripheral surface which are rotatably connected to each other. On the other hand, a reduced diameter portion is provided on a deeper side than a female screw in a core mounting hole. When the valve core is screwed and mounted in the core mounting hole, only the first core cylinder body is rotated in a state where the seal portion of the second core cylinder body is in close contact with the reduced diameter portion, whereby damage of the seal portion can be prevented during the screw mounting (for example, refer to Patent Literature 1).

CITATIONS LIST

Patent Literature 1: JP 2002-340206 A (FIG. 6)

SUMMARY OF INVENTION

Technical Problems

However, the above-described conventional valve core is provided with a caulking engagement portion formed by caulking a part of the fitting section in order to prevent separation between the first core cylinder body and the second core cylinder body, and thus there is a problem that the manufacturing cost increases because of the labor required for the caulking work.

The present invention has been made in view of the above circumstances, and an object of the present invention is to provide a valve core capable of suppressing manufacturing costs as compared to before.

Solutions to Problems

The valve core according to an aspect of the present invention, made to achieve the above object, provides a valve core which includes a first core cylinder body having a male screw to be screwed into a female screw of a core mounting hole, a second core cylinder body arranged on a deeper side than the first core cylinder body in the core mounting hole and having an opening serving as a valve opening on an opposite side to the first core cylinder body, an outer peripheral seal portion provided on the second core cylinder body and to be in close contact with a portion on a deeper side of the core mounting hole than the female screw, a movable member having a valve body for opening and closing the valve opening at an end of a shaft section lineary movably penetrating inside the first core cylinder body and the second core cylinder body, an elastic member coming in contact with the movable member and the first core cylinder body and biasing so that the second core cylinder body is sandwiched between the first core cylinder body and the valve body, and a pair of fitting sections including a first fitting section and a second fitting section which are provided in the first core cylinder body and the second core cylinder body and which are rotatably fitted to each other and are separable without interfering with each other. The pair of fitting sections have cylindrical shapes that are detachably fitted to each other, and the first fitting section has a stepped surface with which an end surface of the second fitting section is in contact.

DESCRIPTION OF EMBODIMENTS

First Embodiment

An embodiment of the present invention will be described below with reference to FIGS. 1 to 6. The reference numeral 10 in FIG. 1 denotes a valve stem, which has a cylindrical shape extending from a tire (not shown), and which has inside, a core mounting hole 11 communicating with the internal space of the tire. A female screw 12 is formed at a position close to the opening of the core mounting hole 11 and a reduced diameter portion 13 which gradually decreases in diameter in the direction away from the female screw 12 is provided on the deeper side thereof. A male screw 14 for screwing and mounting a cap (not shown) is formed on the outer peripheral surface of the valve stem 10.

Figure 3:
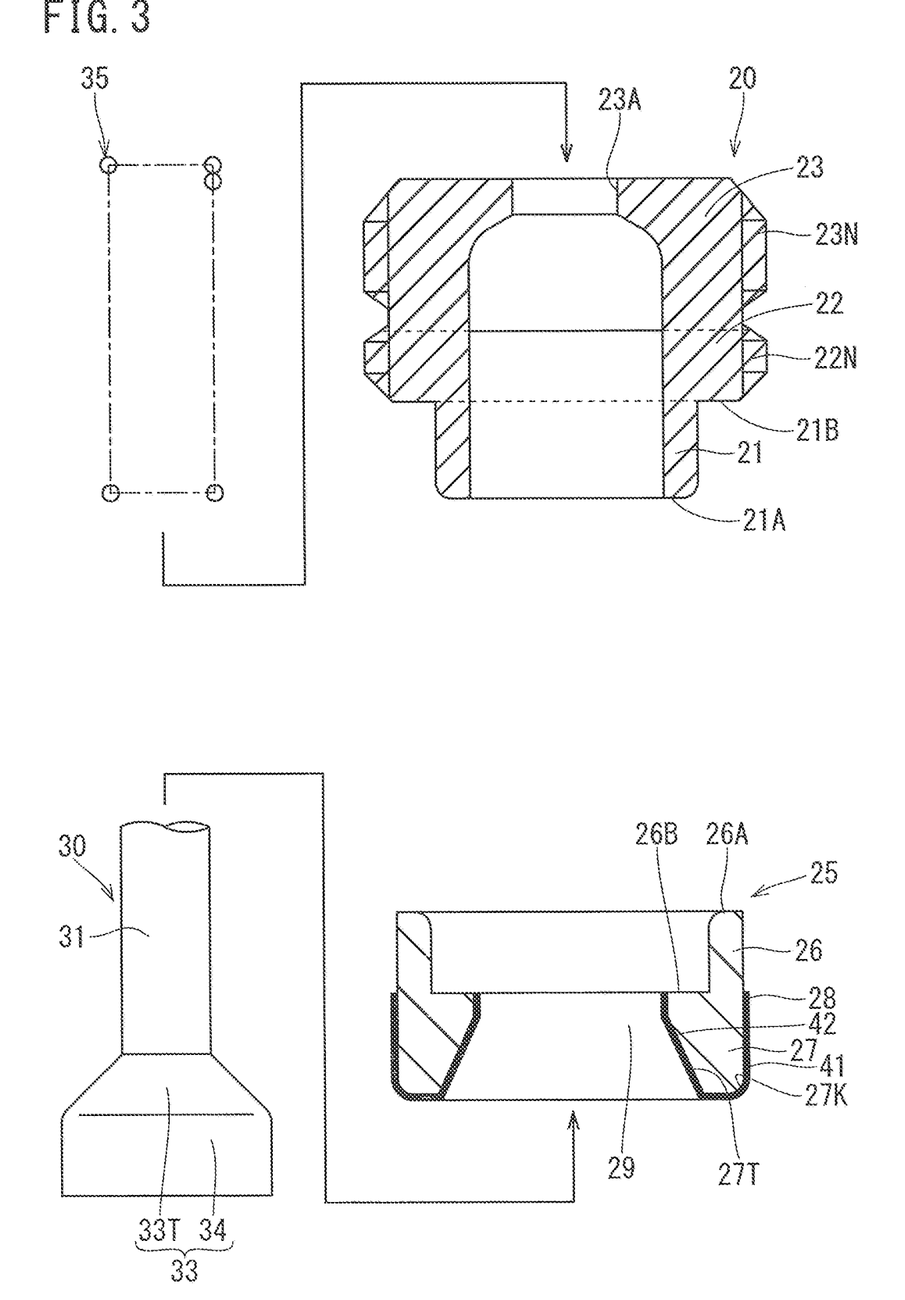
FIG. 3 is an exploded side cross-sectional view of the valve core.
Figure 4:
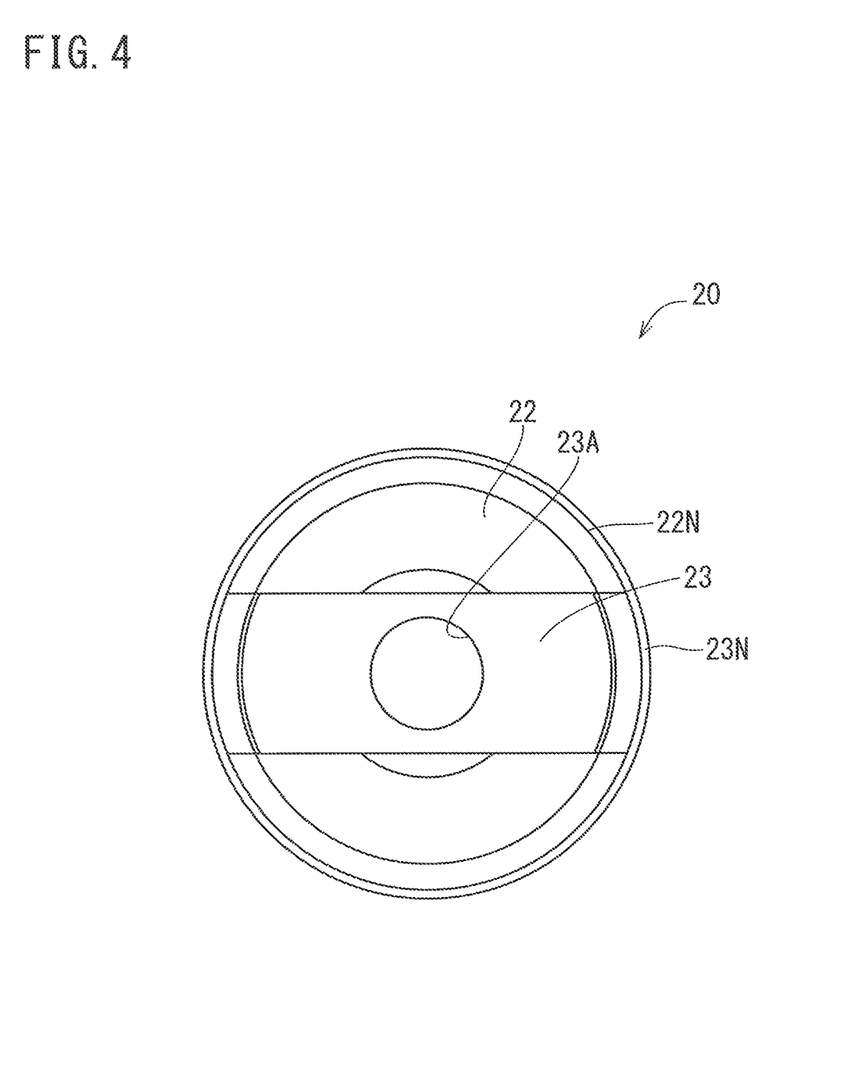
FIG. 4 is a plan view of a second core cylinder body.

A valve core 40 according to the present invention is screwed and mounted in the core mounting hole 11. The valve core 40 includes a first core cylinder body 20, a second core cylinder body 25, a movable member 30, and a compression coil spring 35. As shown in FIG. 3, the first core cylinder body 20 has a fitting section 21, a base section 22, and a gate section 23 arranged side by side from one end toward the other end in an axial direction. The base section 22 has a disc shape having a through hole in the center and a male screw 22N on the outer peripheral surface. As shown in FIGS. 3 and 4, the gate section 23 has a gate structure in which a bridge portion is formed between a pair of supports standing at two positions at an interval of 180 degrees on one end surface of the base section 22, and a shaft guide hole 23A extending along the central axis of the base section 22 passes through the center of the bridge portion. A male screw 23N equal in diameter and in pitch to the male screw 22N of the base section 22 is formed on the outer peripheral surface of the gate section 23. The fitting section 21 has a cylindrical shape, and the outer diameter of the fitting section 21 is smaller than the root diameter of the male screw 22N on the base section 22.

To be more specific, the first core cylinder body 20 is formed by cutting a cylindrical body made of metal as follows. That is, for example, a first center hole having a circular cross section is formed from one end of the cylindrical body to a position closer to the other end, and the shaft guide hole 23A having an inner diameter smaller than that of the first center hole is formed in the remaining portion. After the male screws 22N and 23N are formed on the outer peripheral surface of the cylindrical body in the substantially middle portion in the axial direction and a portion on the other end side shifted from the middle portion, and then the gate section 23 is formed on a portion on the other end side shifted from the middle portion of the cylindrical body in the axial direction by cutting both sides between which the shaft guide hole 23A is sandwiched in a radial direction, as shown in FIG. 4. Further, as shown in FIG. 3, the fitting section 21 is formed by cutting the cylindrical body so that the outer diameter of the cylindrical body on one side of the male screw 22N is reduced with a step, and the portion left between the fitting section 21 and the gate section 23 becomes the base section 22. The corner of the outer edge of the end surface of the fitting section 21 is chamfered so as to have a rounded shape.

Figure 1:
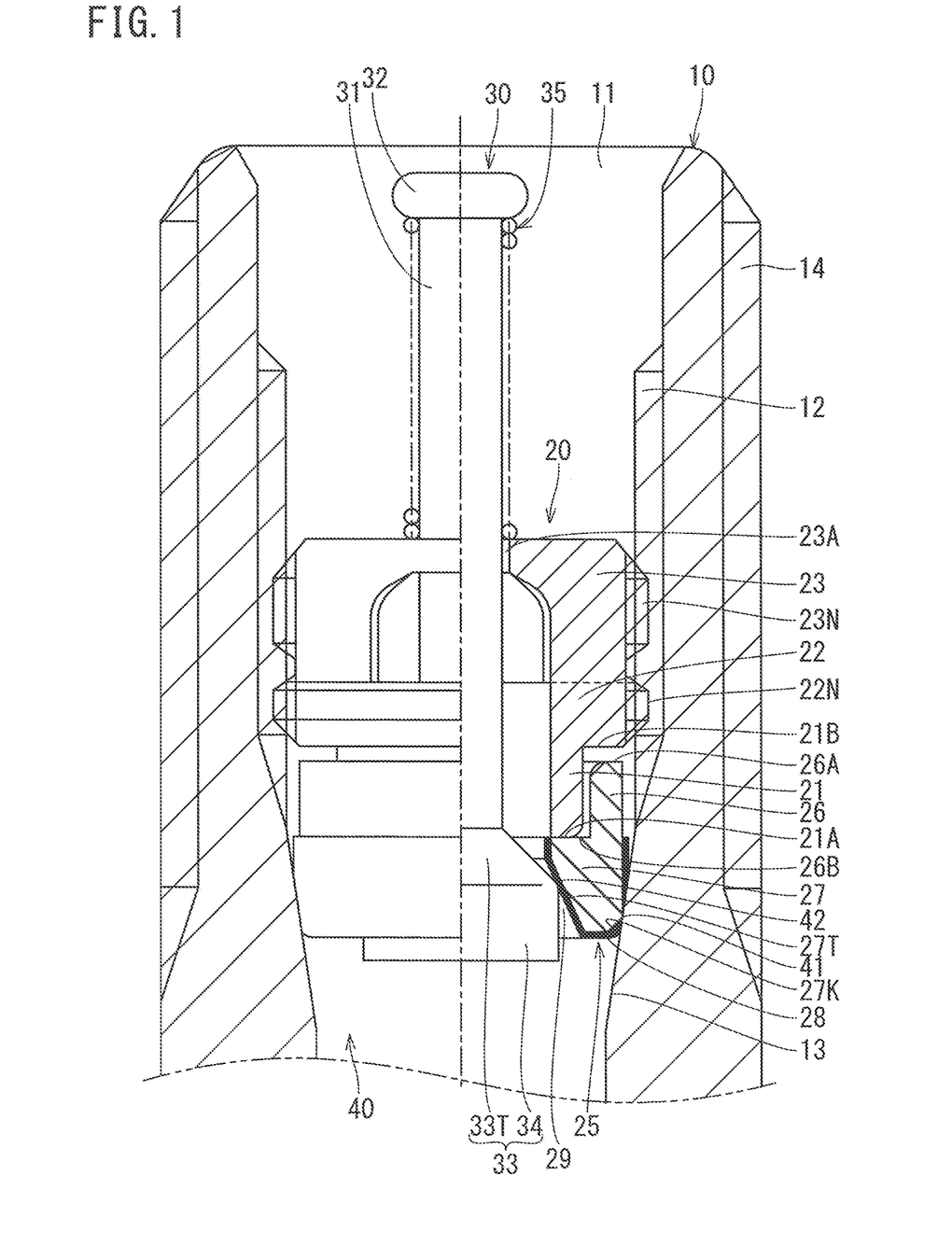
FIG. 1 is a side cross-sectional view of a valve core according to a first embodiment of the present invention.

The second core cylinder body 25 has a fitting section 26 and a base section 27 arranged side by side coaxially. The fitting section 26 has an inner diameter larger than that of the base section 27 with a step and has a stepped surface 26B between the fitting section 26 and the base section 27. A cylindrical surface having a uniform inner diameter is provided from one end on the stepped surface 26B side to a position of the inside of the base section 27 closer to the one end and a tapered inner surface 27T whose inner diameter gradually increases is formed from the cylindrical surface to the other end. Further, the inside of the base section 27 corresponds to a valve opening 29 according to the present invention. Furthermore, the outer diameter of the entire second core cylinder body 25 is uniform, and the outer edge of the end on the base section 27 side is chamfered to be rounded to serve as a corner curved portion 27K. On the other hand, the inner edge of the end on the fitting section 26 side is chamfered to be rounded. As shown in FIG. 1, an assembly is carried out so that the fitting section 26 of the second core cylinder body 25 is fitted to the outside of the fitting section 21 of the first core cylinder body 20, and an end surface 21A of the fitting section 21 of the first core cylinder body 20 is brought into contact with the stepped surface 26B of the fitting section 26 of the second core cylinder body 25. A gap is formed between an end surface 26A of the fitting section 26 of the second core cylinder body 25 and a stepped surface 21B of the fitting section 21 of the first core cylinder body 20. In the present embodiment, the fitting section 26 of the second core cylinder body 25 corresponds to a "first fitting section" of the present invention, and the fitting section 21 of the first core cylinder body 20 corresponds to a "second fitting section" of the present invention.

As shown in FIG. 3, the entire base section 27 is coated with a sealing material 28 (for example, vulcanized rubber or urethane rubber). An outer peripheral seal portion 41 for sealing a space between the inner surface of the core mounting hole 11 and the valve core 40 and a valve opening seal portion 42 for sealing a space between the tapered inner surface 27T and a valve body 33 to be described later are formed by the sealing material 28, as shown in FIG. 1.

The movable member 30 includes the valve body 33 at one end of a shaft section 31 penetrating through the central portions of the first core cylinder body 20 and the second core cylinder body 25, and also a spring locking portion 32 at the other end. The valve body 33 includes a tapered portion 33T whose diameter gradually enlarges from the shaft section 31 and a cylindrical portion 34 extending from the end on the large diameter side of the tapered portion 33T. The inclination of the tapered portion 33T with respect to the central axis of the shaft section 31 is larger than the inclination of the tapered inner surface 27T of the second core cylinder body 25 with respect to the central axis of the shaft section 31. Then, the boundary between the tapered portion 33T and the cylindrical portion 34 comes in contact with the tapered inner surface 27T to close the valve opening 29.

The spring locking portion 32 has a flange shape protruding sideways from the shaft section 31, and the outer diameter of the spring locking portion 32 is larger than the inner diameter of the shaft guide hole 23A. The shaft section 31 is inserted into the compression coil spring 35 which is compressed between the spring locking portion 32 and the gate section 23. The resilient force of the compression coil spring 35 is used as the biasing force for closing the valve opening 29 by the valve body 33 and is also used as the holding force for preventing separation of the first core cylinder body 20 and the second core cylinder body 25.

In addition, when the movable member 30 is pushed down against the resilient force of the compression coil spring 35, the wire members constituting the compression coil spring 35 come into close contact with each other, so that the movable member 30 cannot be pushed down any further. In the present embodiment, the fitting depth of the fitting sections 21 and 26 is deeper than the linear movement stroke of the movable member 30. As a result, before the valve core 40 is mounted in the core mounting hole 11, when the valve body 33 of the movable member 30 separates from the second core cylinder body 25 so that the first core cylinder body 20 and the second core cylinder body 25 separate from each other, the pair of fitting sections 21 and 26 cannot be completely separated from each other.

The configuration of the valve core 40 of the present embodiment has been described above. The valve core 40 is assembled into the core mounting hole 11 as follows. That is, the valve core 40 is rotated while being inserted into the core mounting hole 11 with the second core cylinder body 25 in the lead. Then, the valve core 40 moves toward the deeper side of the core mounting hole 11 due to engagement between the male screws 22N and 23N of the valve core 40 and the female screw 12 of the core mounting hole 11, and eventually the outer peripheral seal portion 41 of the second core cylinder body 25 comes in contact with the reduced diameter portion 13 of the core mounting hole 11, and then the rotation of the second core cylinder body 25 stops, as shown in FIG. 1. In this state, when the valve core 40 is rotated, only the first core cylinder body 20 rotates, and the whole valve core 40 advances to the deeper side of the core mounting hole 11, and then the sealing material 28 on the outer peripheral seal portion 41 comes to be squeezed between the second core cylinder body 25 and the reduced diameter portion 13 of the core mounting hole 11, whereby the valve core 40 is not advanced to the deeper side any further, and the mounting of the valve core 40 on the core mounting hole 11 is completed.

Figure 2:
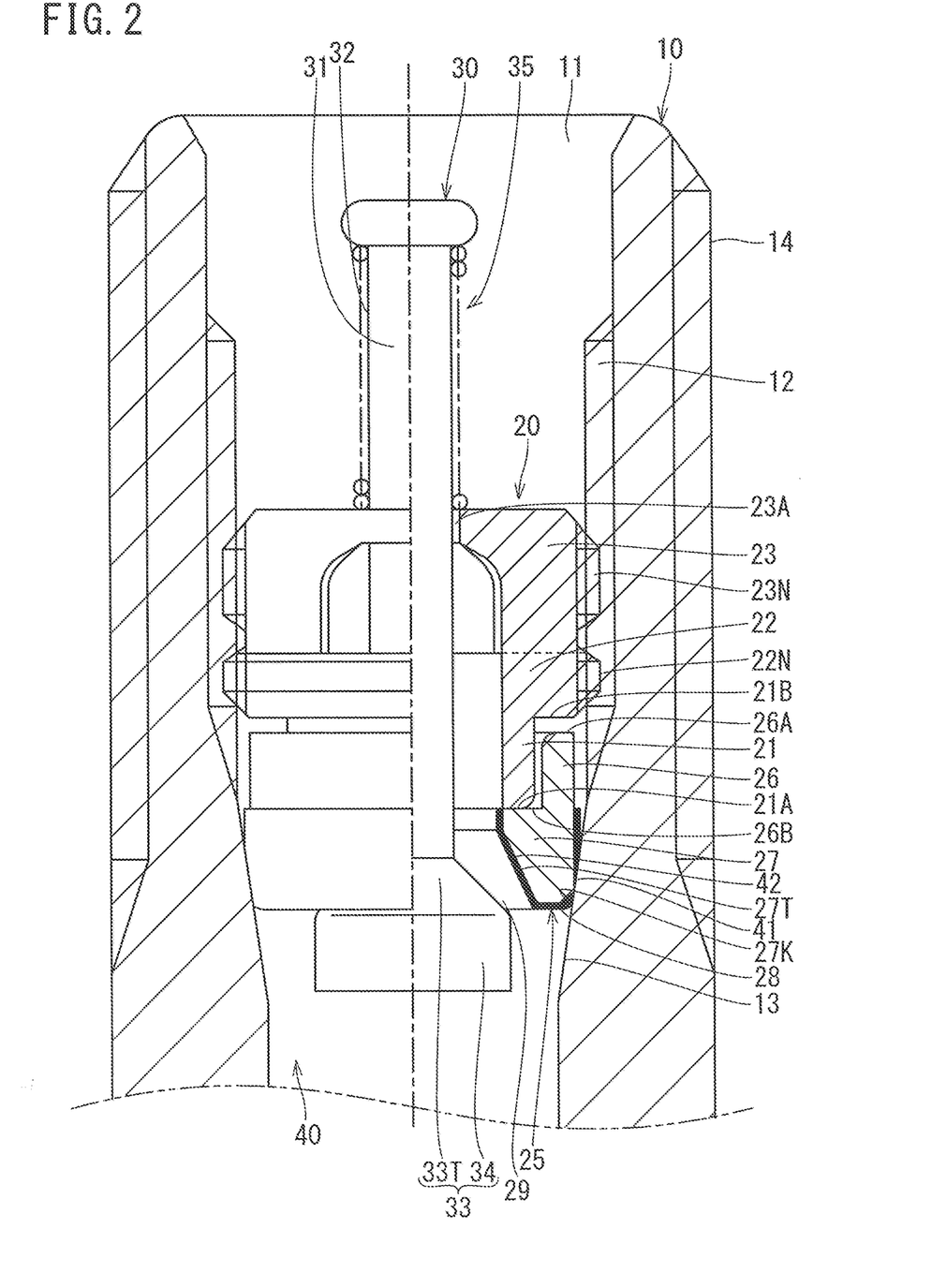
FIG. 2 is a side cross-sectional view in a state in which the valve core is opened.

The core mounting hole 11 on which the valve core 40 is mounted is normally closed by the valve core 40. When air having a higher pressure than that in the tire is applied from the end side of the core mounting hole 11, the valve core 40 opens and air is supplied into the tire, as shown in FIG. 2. Also, the valve core 40 is opened by pushing down the movable member 30, and air in the tire can be removed.

The valve core 40 is manufactured as follows. The second core cylinder body 25 not having been coated with the sealing material 28, the movable member 30 without the spring locking portion 32, the first core cylinder body 20 and the movable member 30 are prepared. Then, the second core cylinder body 25 is set on a jig 90 shown in FIGS. 5(A), 5(B) and 6.

Figure 5A:
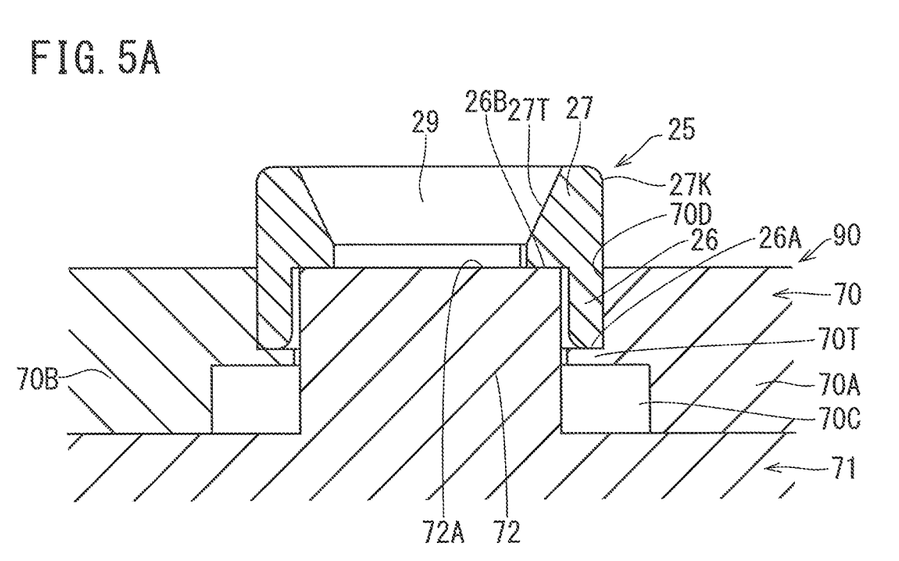
FIG. 5(A) is a side cross-sectional view of the second core cylinder body and jigs before coating with a sealing material.

The jig 90 includes first to fourth jigs 70, 71, 73, and 74, for example. As shown in FIG. 5(A), the first jig 70 has a structure in which a flat plate having a circular hole 70D fittable to the outer side of the fitting section 26 of the second core cylinder body 25 is divided into a pair of split bodies 70A and 70B along a division surface crossing the circular hole 70D. Also, in the circular hole 70D, a ring protrusion 70T is provided which fits in a gap (see FIG. 1) between the stepped surface 21B of the fitting section 21 and the end surface 26A of the fitting section 26 of the valve core 40. Further, a portion below the ring protrusion 70T of the circular hole 70D has an enlarged diameter portion 70C whose diameter is enlarged to accommodate the base section 22 of the first core cylinder body 20. In addition, the second jig 71 includes a support 72 having a cylindrical shape to be fitted inside the fitting section 26 of the second core cylinder body 25.

Figure 6:
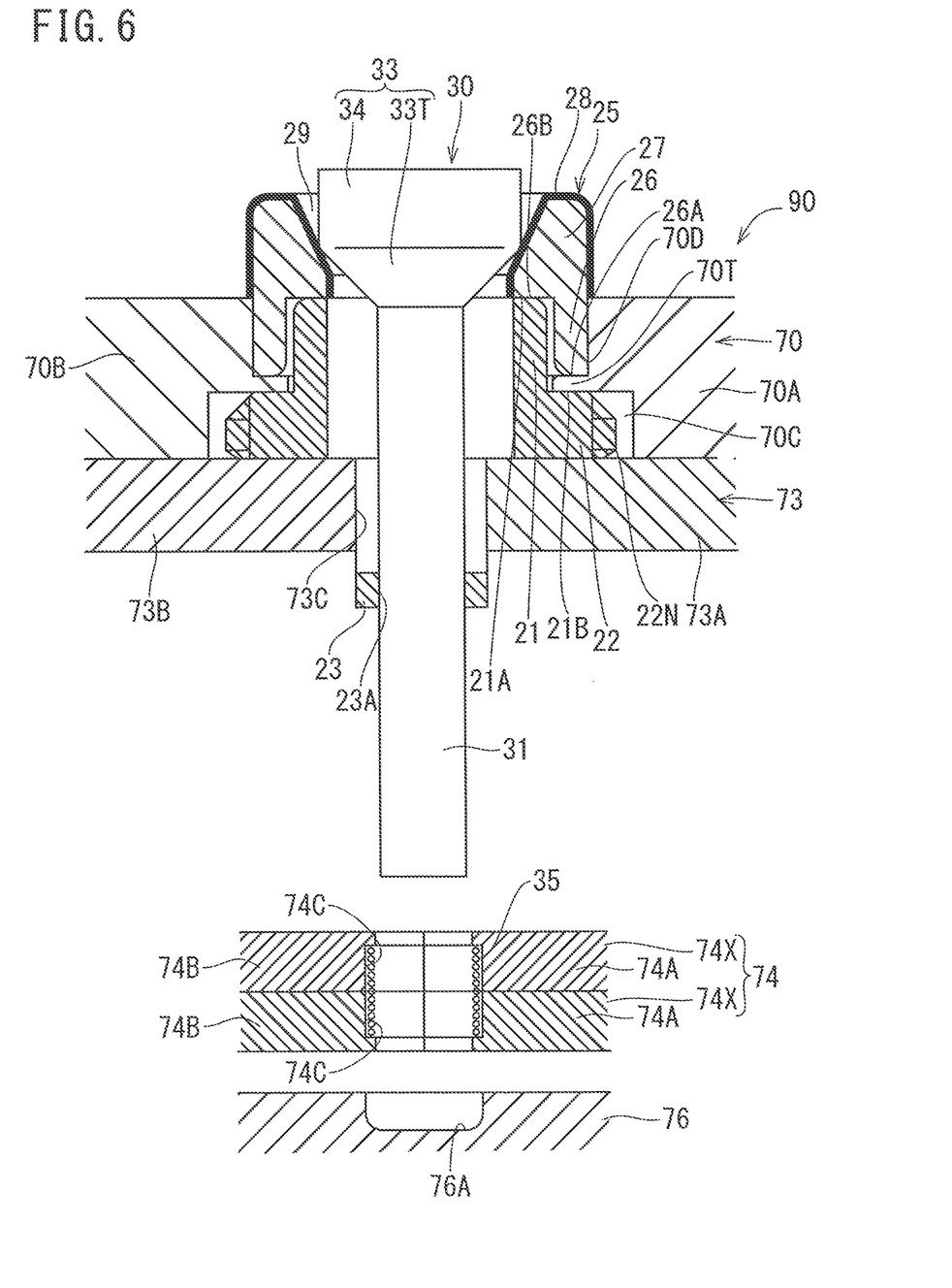
FIG. 6 is a side cross-sectional view of a first core cylinder body and the second core cylinder body assembled in a state of being held by the jigs.

As shown in FIG. 6, the third jig 73 has a structure in which a flat plate having a through hole 73C which has a rectangular shape and is fittable to the outside of the gate section 23 is divided into a pair of split bodies 73A and 73B along a division surface crossing the through hole 73C.

The fourth jig 74 includes a pair of clamping tools 74X and 74X, and each clamping tool 74X is made up of a flat plate having a through hole 74C fittable to the outside of one end of the compression coil spring 35 and divided into two pairs of split bodies 74A and 74B along a division surface crossing the through hole 74C. The pair of clamping tools 74X and 74X are stacked one above the other and the ends away from each other of the through holes 74C and 74C of the clamping tools 74X and 74X are each reduced in diameter with a step. In addition, the upper and lower clamping tools 74X and 74X come into contact with and separate from each other, whereby the fourth jig 74 can hold the compression coil spring 35 in a compressively deformed state.

Figure 5B:
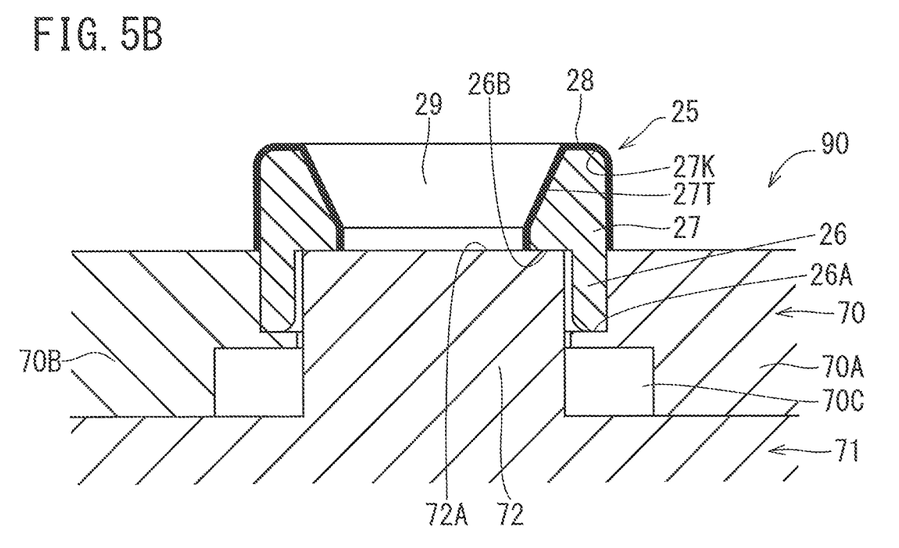
FIG. 5(B) is a side cross-sectional view of the second core cylinder body and the jigs after coating with the sealing material.

Assembly of each part of the valve core 40 is performed as follows. That is, for example, the fitting section 26 of the second core cylinder body 25 is fitted to the support 72 of the second jig 71 and an end surface 72A of the support 72 is brought into contact with the stepped surface 26B, as shown in FIG. 5(A). Next, the split bodies 70A and 70B of the first jig 70 are incorporated with each other from both sides of the second core cylinder body 25 so that the fitting section 26 is fitted in the circular hole 70D. Then, rubber as the sealing material 28 is sprayed, for example, for coating the base section 27 of the second core cylinder body 25 protruding upward from the upper surface of the first jig 70, as shown in FIG. 5(B). In this way, the necessary portion of the second core cylinder body 25 is coated with the sealing material 28 without adhesion of the sealing material 28 on the contact portion of the second core cylinder body 25 to be in contact with the first core cylinder body 20.

When the sealing material 28 is solidified, the second jig 71 is retracted so that the second core cylinder body 25 is held only by the first jig 70. Further, the gate section 23 of the first core cylinder body 20 is fitted into the through hole 73C of the third jig 73 from above so that the first core cylinder body 20 is held on the third jig 73 as shown in FIG. 6. Then, the third jig 73 is brought close to the first jig 70 from below, and the fitting section 21 of the first core cylinder body 20 is fitted into the fitting section 26 of the second core cylinder body 25.

In this state, the shaft section 31 of the movable member 30 is inserted into the second core cylinder body 25 from above. Then, the shaft section 31 is inserted into the compression coil spring 35 held in the compressively deformed state by the fourth jig 74, and the lower end of the shaft section 31 is pressed against a die 76 having a recess 76A for forming, thereby forming the spring locking portion 32. Thus, the assembly of the valve core 40 is completed. Then, the valve core 40 can be taken out from the jig 90 by opening the first jig 70, the third jig 73, and the fourth jig 74 with division surfaces.

As described above, according to the valve core 40 of the present embodiment, since the conventional caulking engagement portion that ensures engagement so as not to separate the first core cylinder body 20 and the second core cylinder body 25 is eliminated, the caulking work of the caulking engagement portion is eliminated, and the manufacturing cost can be suppressed. That is, in the valve core 40 of the present embodiment, the resilient force of the movable member 30 is used not only as the biasing force for the valve body 33 to close the valve opening 29, but also as the holding force for preventing separation of the first core cylinder body 20 and the second core cylinder body 25, so that a structure in which the pair of fitting sections 21 and 26 of the first core cylinder body 20 and the second core cylinder body 25 can be separated without interference with each other, that is, a structure without the conventional caulking engagement portion is adopted, whereby the manufacturing cost can be reduced. The valve opening seal portion 42 between the valve body 33 and the valve opening 29 and the outer peripheral seal portion 41 between the valve core 40 and the inner peripheral surface of the core mounting hole 11 can be formed at one time by the coating of the second core cylinder body 25 with the sealing material 28, and also in this respect, the manufacturing cost can be suppressed. The labor for assembly can be reduced as compared with the case of assembling the sealing ring, and thus the manufacturing cost can be suppressed.

Second Embodiment

Figure 7:
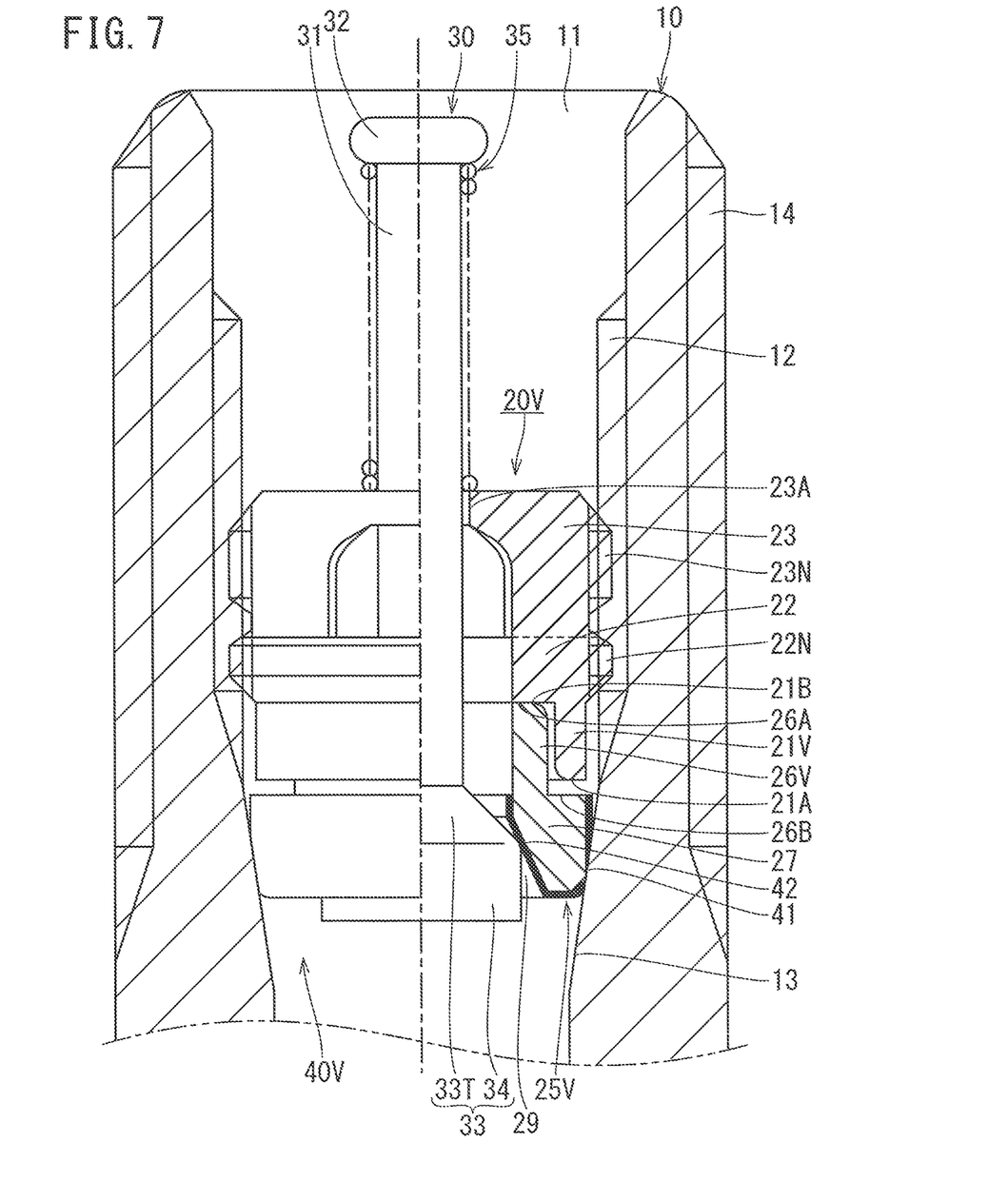
FIG. 7 is a side cross-sectional view of a valve core according to a second embodiment.
Figure 8A:
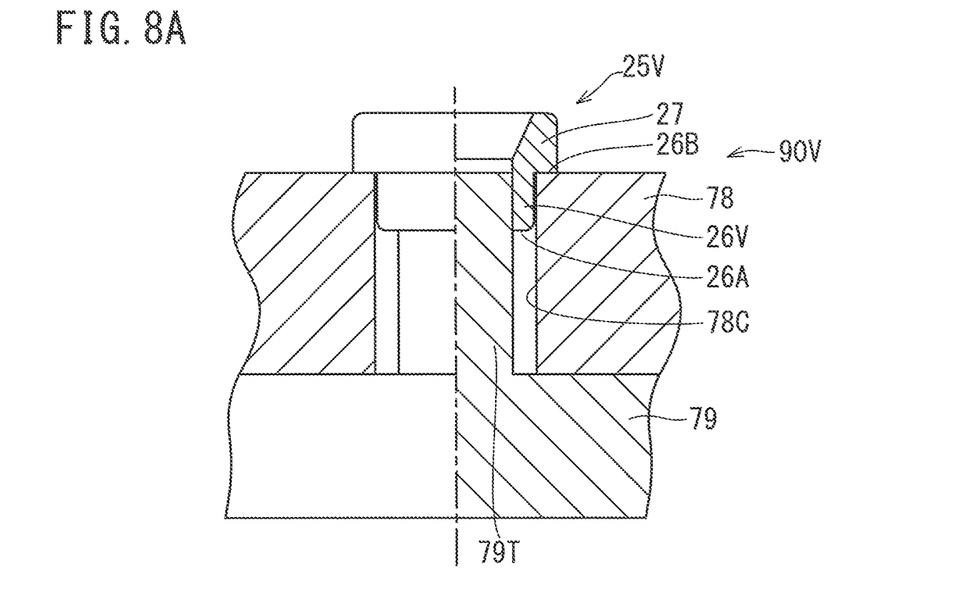
FIG. 8(A) is a side cross-sectional view of a second core cylinder body and jigs before coating with a sealing material.
Figure 8B:
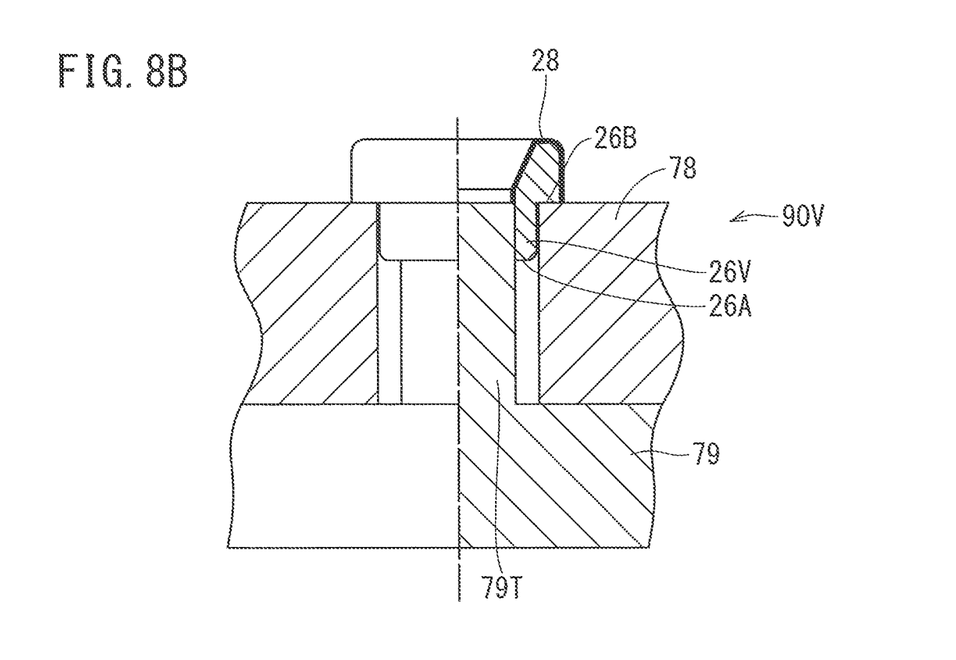
FIG. 8(B) is a side cross-sectional view of the second core cylinder body and the jigs after coating with the sealing material.

A valve core 40V of the present embodiment is shown in FIGS. 7, 8(A) and 8(B). In this valve core 40V, a fitting section 21V of a first core cylinder body 20V protrudes from the position close to the outer edge of the base section 22, and the stepped surface 21B is formed on the inner surface of the first core cylinder body 20V between the fitting section 21V and the base section 22, as shown in FIG. 7. In a second core cylinder body 25V, a fitting section 26V protrudes from a position close to the inner edge of the base section 27, and the stepped surface 26B is formed on the outer surface of the second core cylinder body 25V between the fitting section 26V and the base section 27. Then, the end surface 26A of the fitting section 26V of the second core cylinder body 25V is in contact with the stepped surface 21B of the fitting section 21V of the first core cylinder body 20V, and a gap is formed between the end surface 21A of the fitting section 21V of the first core cylinder body 20V and the stepped surface 26B of the fitting section 26V of the second core cylinder body 25V. In the present embodiment, the fitting section 26V of the second core cylinder body 25V corresponds to the "second fitting section" of the present invention, and the fitting section 21V of the first core cylinder body 20V corresponds to the "first fitting section" of the present invention.

In addition, a jig 90V for coating the second core cylinder body 25V with the sealing material 28 is shown in FIGS. 8(A) and 8(B). The jig 90V includes a first jig 78 and a second jig 79, and a through hole 78C into which the fitting section 26V of the second core cylinder body 25V can be fitted exactly is formed on the first jig 78. Further, the second jig 79 has a support 79T to be fitted into the fitting section 26V. Then, the base section 27 is coated with rubber as the sealing material 28 by spraying while the fitting section 26V of the second core cylinder body 25V is fitted into the through hole 78C from above so that the stepped surface 26B of the fitting section 26V comes in contact with the upper surface of the first jig 78, and the support 79T of the second jig 79 is fitted into the fitting section 26V, as shown in FIG. 8(A). The seal material can be prevented from adhering to the contact portion of the second core cylinder body to be in contact with the first core cylinder body.

Third Embodiment

Figure 9:
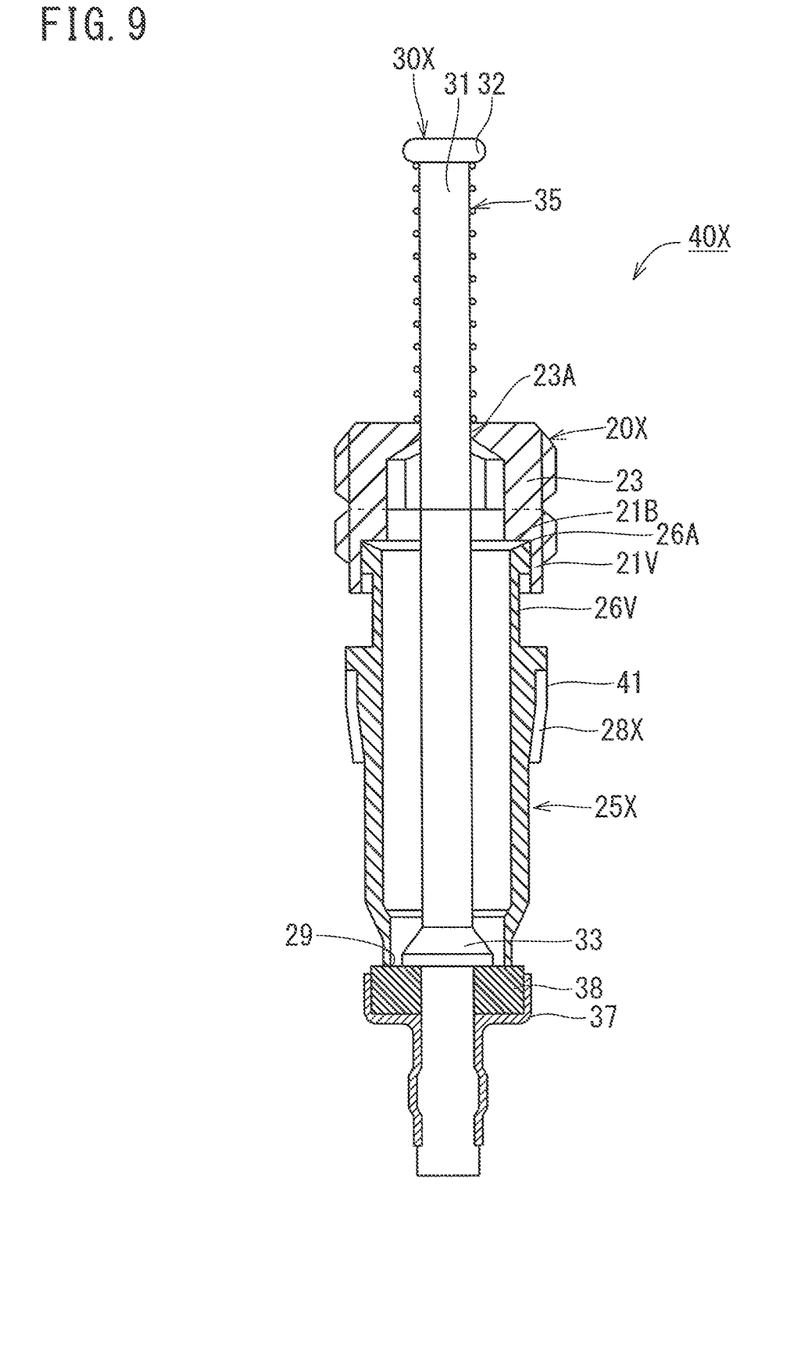
FIG. 9 is a side cross-sectional view of a valve core according to a third embodiment.

A valve core 40X of the present embodiment is shown in FIG. 9, and a second core cylinder body 25X is longer than a first core cylinder body 20X. Further, a seal ring 28X is fitted on substantially the middle of the outer peripheral surface of the second core cylinder body 25X in the axial direction, thereby constituting the outer peripheral seal portion 41 according to the present invention. The end of the second core cylinder body 25X is cylindrical. On the other hand, a seal support plate 37 having a thin dish shape is provided at a position close to the end of the shaft section 31 of a movable member 30X, and a seal member 38 retained in the seal support plate 37 comes in contact with the end surface of the second core cylinder body 25X. Regarding configurations other than above, the same parts as those of the first or second embodiment are denoted by the same reference numerals and redundant descriptions are omitted.

The valve core can be made with the following configuration, other than the above embodiments. The pair of fitting sections including the first fitting section and the second fitting section may have a tapered shape to be fitted to each other. An annular groove may be formed on the outer peripheral surface of the second core cylinder body, and the outer peripheral seal portion may be constituted by a sealing ring retained in the annular groove. The second core cylinder body may be made of a metal having a hardness different from that of the metal forming a mating member having the core mounting hole, and a part of the second core cylinder body may be used as an outer peripheral seal portion for a metal seal. With such a configuration, the labor for assembly can be reduced, and the manufacturing cost can be suppressed. Further, either a tension coil spring or a compression coil spring may be used for the elastic member.

REFERENCE SIGNS LIST 10 valve stem
11 core mounting hole
12 female screw
20, 20V, 20X first core cylinder body
21, 21V, 26, 26V fitting section
21A, 26A end surface
21B, 26B stepped surface
22N, 23N male screw
25, 25V, 25X second core cylinder body
27T tapered inner surface
28 sealing material
29 valve opening
30, 30X movable member
31 shaft section
32 spring locking portion
33 valve body
35 compression coil spring (elastic member)
40, 40V, 40X valve core
41 outer peripheral seal portion
42 valve opening seal portion

The invention claimed is:

1. A valve core comprising:
a first core cylinder body having a male screw to be screwed into a female screw of a core mounting hole;
a second core cylinder body arranged on a deeper side than the first core cylinder body in the core mounting hole and having an opening as a valve opening on an opposite side to the first core cylinder body;
an outer peripheral seal portion provided on the second core cylinder body and to be in contact with a portion on a deeper side than the female screw of the core mounting hole;
a movable member having a valve body to open and close the valve opening at an end of a shaft section linearly movably penetrating inside the first core cylinder body and the second core cylinder body;
an elastic member in contact with the movable member and the first core cylinder body and biasing so as to sandwich the second core cylinder body between the first core cylinder body and the valve body; and
a pair of fitting sections including a first fitting section and a second fitting section which are provided in the first core cylinder body and the second core cylinder body and which are rotatably fitted to each other and are separable without interfering with each other,
wherein the pair of fitting sections have cylindrical shapes that are detachably fitted to each other, and
the first fitting section has a stepped surface with which an end surface of the second fitting section is in contact.

2. The valve core according to claim 1, wherein the outer peripheral seal portion is formed by coating the second core cylinder body with a sealing material.

3. The valve core according to claim 2 wherein the valve opening has a tapered inner surface which gradually increases in diameter toward a valve body side and with which the valve body comes in contact, and the tapered inner surface is coated with the sealing material constituting the outer peripheral seal portion.

4. The valve core according to claim 3, wherein the first fitting section is formed by enlarging with a step, a diameter of an inner peripheral surface of the second core cylinder body on a first core cylinder body side shifted from the tapered inner surface, and the end surface of the second fitting section is in contact with the stepped surface of the first fitting section, and only the inner peripheral surface of the second core cylinder body on the tapered inner surface side shifted from the stepped surface is coated with the sealing material.

5. The valve core according to claim 3, wherein
the second fitting section is formed by reducing with a step so that the second fitting section has a stepped surface, a diameter of an outer peripheral surface of the second core cylinder body on a first core cylinder body side, and the end surface of the second fitting section is in contact with the stepped surface of the first fitting section, and
only the outer peripheral surface of the second core cylinder body on a side away from the first core cylinder body farther than the stepped surface of the second core cylinder body is coated with the sealing material.

6. The valve core according to claim 1, wherein
a fitting depth of the pair of fitting sections is larger than a linear movement stroke of the movable member.

7. The valve core according to claim 2, wherein
a fitting depth of the pair of fitting sections is larger than a rectilinear movement stroke of the movable member.

8. The valve core according to claim 3, wherein
a fitting depth of the pair of fitting sections is larger than a rectilinear movement stroke of the movable member.

9. The valve core according to claim 4, wherein
a fitting depth of the pair of fitting sections is larger than a rectilinear movement stroke of the movable member.

10. The valve core according to claim 5, wherein
a fitting depth of the pair of fitting sections is larger than a rectilinear movement stroke of the movable member.

11. The valve core according to claim 1, further comprising
a spring locking portion formed by enlarging a diameter of an end of the shaft section on an opposite side to the valve body,
wherein the elastic member is a compression coil spring into which the shaft section is inserted so that one end of the compression coil spring is engaged with the spring locking portion, and another end is engaged with an end of the first core cylinder body on an opposite side to the second core cylinder body.

12. The valve core according to claim 2, further comprising
a spring locking portion formed by enlarging a diameter of an end on an opposite side of the shaft section from the valve body,
wherein the elastic member is a compression coil spring into which the shaft section is inserted so that one end of the compression coil spring is engaged with the spring locking portion, and another end is engaged with an end on an opposite side of the first core cylinder body from the second core cylinder body.

13. The valve core according to claim 3, further comprising
a spring locking portion formed by enlarging a diameter of an end on an opposite side of the shaft section from the valve body,
wherein the elastic member is a compression coil spring into which the shaft section is inserted so that one end of the compression coil spring is engaged with the spring locking portion, and another end is engaged with an end on an opposite side of the first core cylinder body from the second core cylinder body.

14. The valve core according to claim 4, further comprising
a spring locking portion formed by enlarging a diameter of an end on an opposite side of the shaft section from the valve body,
wherein the elastic member is a compression coil spring into which the shaft section is inserted so that one end of the compression coil spring is engaged with the spring locking portion, and another end is engaged with an end on an opposite side of the first core cylinder body from the second core cylinder body.

15. The valve core according to claim 5, further comprising
a spring locking portion formed by enlarging a diameter of an end on an opposite side of the shaft section from the valve body,
wherein the elastic member is a compression coil spring into which the shaft section is inserted so that one end of the compression coil spring is engaged with the spring locking portion, and another end is engaged with an end on an opposite side of the first core cylinder body from the second core cylinder body.

16. The valve core according to claim 6, further comprising
a spring locking portion formed by enlarging a diameter of an end on an opposite side of the shaft section from the valve body,
wherein the elastic member is a compression coil spring into which the shaft section is inserted so that one end of the compression coil spring is engaged with the spring locking portion, and another end is engaged with an end on an opposite side of the first core cylinder body from the second core cylinder body.

* * * * *